United States Patent [19]

Horn et al.

[11] Patent Number: 4,576,367

[45] Date of Patent: Mar. 18, 1986

[54] PNEUMATIC MECHANICAL CLAMP INCLUDING LOCKING MEANS

[75] Inventors: Edward R. Horn, Germantown; Norbert J. Kot, II, Milwaukee, both of Wis.

[73] Assignee: Aladdin Engineering & Mfg. Co., Brookfield, Wis.

[21] Appl. No.: 688,189

[22] Filed: Jan. 2, 1985

[51] Int. Cl.[4] .................... B23Q 3/08

[52] U.S. Cl. .................... 269/32; 269/94; 269/228; 269/229

[58] Field of Search .................... 269/32, 91, 93-94, 269/228, 229

[56] References Cited

U.S. PATENT DOCUMENTS

| | | | |
|---|---|---|---|
| 2,236,439 | 3/1941 | McKenna | 269/229 |
| 2,537,594 | 1/1951 | Lehmann | 269/229 |
| 2,545,668 | 3/1951 | Merriman | 269/94 |
| 3,273,878 | 9/1966 | Blatt | 269/32 |
| 3,302,943 | 2/1967 | Mericle, Jr. | 269/32 |
| 3,347,542 | 10/1967 | Mericle, Jr. | 269/228 X |
| 3,381,954 | 5/1968 | Blatt | 269/32 |
| 3,545,050 | 12/1970 | Blatt et al. | |
| 3,565,415 | 2/1971 | Blatt | 269/32 |
| 3,567,208 | 3/1971 | Blatt | 269/32 |
| 3,702,185 | 11/1972 | Blatt | 269/32 |
| 4,407,493 | 10/1983 | Okolischan | 269/228 X |

FOREIGN PATENT DOCUMENTS

| | | | |
|---|---|---|---|
| 709285 | 5/1954 | United Kingdom | 269/228 |

*Primary Examiner*—Frederick R. Schmidt

*Assistant Examiner*—Steven P. Schad

[57] ABSTRACT

A mechanical clamp for releaseably clamping a workpiece against a supporting surface. The clamp includes means for releaseably locking the clamping member in a clamping position without use of an overcenter movement of the clamp toggle links.

13 Claims, 9 Drawing Figures

PNEUMATIC MECHANICAL CLAMP INCLUDING LOCKING MEANS

FIELD OF THE INVENTION

The present invention is directed to mechanical clamping apparatus of a type for use in securing a workpiece in place.

BACKGROUND OF THE INVENTION

Mechanical clamps are commonly used in manufacturing processes to clamp a workpiece in place and to secure the workpiece while it is being machined, welded or otherwise worked.

An example of prior art mechanical clamp apparatus is shown in the Lehmann U.S. Pat. No. 2,537,594 issued Jan. 9, 1951 and in the McKenna U.S. Pat. No. 2,236,439 issued Mar. 25, 1941.

Other prior art mechanical clamps include a pneumatic cylinder for causing clamping movement of the clamping devices of such clamps and holding these clamping devices in clamping engagement with a workpiece. Examples of such mechanical clamps and including fluid cylinders are illustrated in the Blatt patents: U.S. Pat. No. 3,702,185 issued Nov. 7, 1972; U.S. Pat. No. 3,545,050 issued Dec. 8, 1970; U.S. Pat. No. 3,565,415 issued Feb. 23, 1971; U.S. Pat. No. 3,567,208 issued Mar. 2, 1971; U.S. Pat. No. 3,381,954 issued May 7, 1968; U.S. Pat. No. 3,362,703 issued Jan. 9, 1968; and U.S. Pat. No. 3,273,878 issued Sept. 20, 1966. Attention is also directed to The Mericle U.S. Pat. No. 3,302,943 issued Feb. 7, 1967 and the Mericle U.S. Pat. No. 3,347,542 issued Oct. 17, 1967.

In those clamping devices where a fluid cylinder is provided, it is preferred that the fluid cylinder be a pneumatic cylinder rather than a hydraulic cylinder in order to take advantage of the availability of a supply of compressed air in most common manufacturing facilities. If the cylinders used are pneumatic cylinders, the clamping arrangements are substantially less expensive to manufacture since a hydraulic pump is not required. However, one of the problems with the use of pneumatic cylinders for applying clamping force is that mechanical clamps may release the workpiece if the supply of air to the pneumatic cylinder is interrupted. Such mechanical clamps are commonly used to secure a workpiece in place while the workpiece is being machined or otherwise worked. If the pneumatic cylinder releases the workpiece while it is being worked, the electrically driven machine may continue to operate even though the workpiece is released.

Some of the prior art mechanical clamps avoid these problems by employing overcenter toggle arrangements for locking the clamping member into clamping position. During the operation of the overcenter toggles, as the toggle links approach the overcenter position, the toggle links and pins joining the toggle links are subjected to very high loads, and there is deformation of at least some of the parts of the toggle links as they move through the overcenter position. These high loads and deformation of parts can result in substantial wear of the parts and reduces the useful life of the mechanical clamp. Where the mechanical clamp is used in the manufacturing operation to hold the workpiece. the mechanical clamp may be subjected to numerous operating cycles and a long useful life of the mechanical clamp is necessary.

SUMMARY OF THE INVENTION

The present invention provides an improved mechanical clamp for use in holding a workpiece in place. The clamp embodying the invention includes means for releaseably locking the clamping member in a clamping position and provides a mechanical clamp having an extended useful life. The mechanical clamp embodying the invention includes a clamp member movable between a release position and a workpiece clamping position. A toggle assembly is provided for causing clamping movement of the workpiece, and a piston of a pneumatic cylinder is operably connected to the toggle assembly to cause clamping movement. A locking member is also provided for releasably locking the toggle assembly in the clamping position, and means are provided for maintaining the locking member in the locking position.

More specifically, the present invention includes a mechanical clamp for use in clampingly engaging the workpiece, and including a frame and a clamp member pivotally connected to the frame and having an end portion supported for movement toward and away from the supporting surface for clampingly engaging the workpiece against the supporting surface. Means are also provided for selectively forcing the end portion of the clamp member into clamping engagement with the workpiece, this means including a roller engageable with a cam surface of the clamp member and a first toggle lever having one end supporting the roller. A second toggle lever is also provided and has one end pivotally connected to the frame and an opposite end pivotally connected to an opposite end of the first toggle lever. A third toggle lever has one end pivotally connected to the second toggle lever intermediate its opposite ends, and the opposite end of the third toggle lever is pivotally connected to the piston for reciprocal movement with the piston between an extended position wherein the clamp member is in the clamping position and a retracted position wherein the clamp member is in the release position. Means are further provided for releasably locking the third toggle lever in the extended position whereby the clamp member is held in the clamping position.

In one embodiment of the invention the means for releasably locking includes a locking member supported for pivotal movement between a release position and a locking position wherein the third toggle lever is held in the extended position.

In one embodiment of the invention a slide member is supported for reciprocal linear movement between an extended position and a retracted position and connected to the piston. The slide member has a rearward surface portion, and the locking member includes an engaging portion adapted to slideably engage an upper portion of the slide as the slide moves from the retracted position to the extended position, and the engaging portion is adapted to engage the rearward surface portion of the slide when the slide is in the extended position.

In one embodiment of the invention a spring means is provided for resiliently biasing the locking member for pivotal movement to a position wherein the locking member engaging portion engages the rearward surface portion of the slide member.

In one embodiment of the invention a pin pivotally connects one of the opposite ends of the second toggle lever to the frame, and the locking member is supported by the pin for pivotal movement on the pin.

One of the advantages of the present invention is that the construction provides a clamp arrangement generating substantial clamping force and without the provision of an overcenter toggle arrangement. Accordingly, the construction of the invention yields a mechanical clamp which has a long useful wear life. Another of the advantages of the mechanical clamp embodying the invention is that it can employ a pneumatic cylinder connected to a source of compressed air as is commonly available in a manufacturing facility. Even though this compressed air source is normally at a relatively low pressure, for example 80 p.s.i., the mechanical clamp of the invention can generate a substantial clamping force.

Another advantage of the present invention is that the locking member embodied in the mechanical clamp automatically locks the clamp member in the locking position each time the clamping arm engages the workpiece. Additionally, the construction of the toggle arrangement embodied in the mechanical clamp in combination with the locking means provides a clamping arrangement wherein the clamp member is resistant to the forces on the clamping member applied by the workpiece during machining of the workpiece.

Various other features and advantages of the invention will be apparent by reference to the following description of a preferred embodiment, from the drawings and from the claims.

Figure 1:
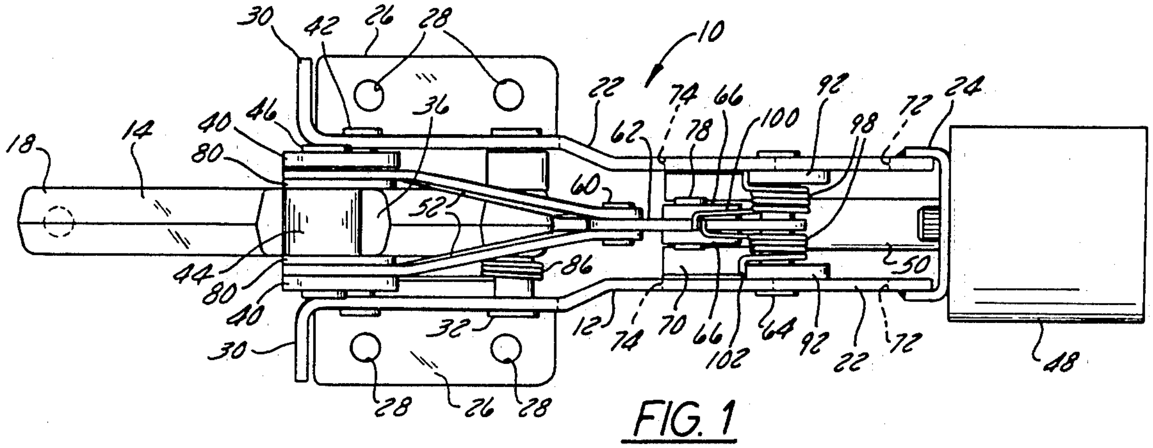
FIG. 1 is a plan view of a mechanical clamp embodying the present invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a mechanical clamp 10 embodying the present invention. The mechanical clamp 10 includes a frame or base 12 supporting a pivotable clamp arm 14, the clamp arm 14 having one end 16 pivotably supported by the base 12 and an opposite end 18 adapted to clampingly engage a workpiece 20.

While the frame or base 12 could be constructed in various ways, in the particular arrangement illustrated in the drawings, the frame 12 is comprised of a pair of spaced generally parallel metal plates 22 joined at their rearward ends by an end plate 24. Mounting flanges 26 project outwardly from the lower edges of the forward portions of the plates 22. The mounting flanges 26 include bores 28 adapted to house mounting bolts such that the frame or base 12 can be secured to a supporting surface. Similar flanges 30 project outwardly from the forward edges of the side plates 22.

Figure 2:
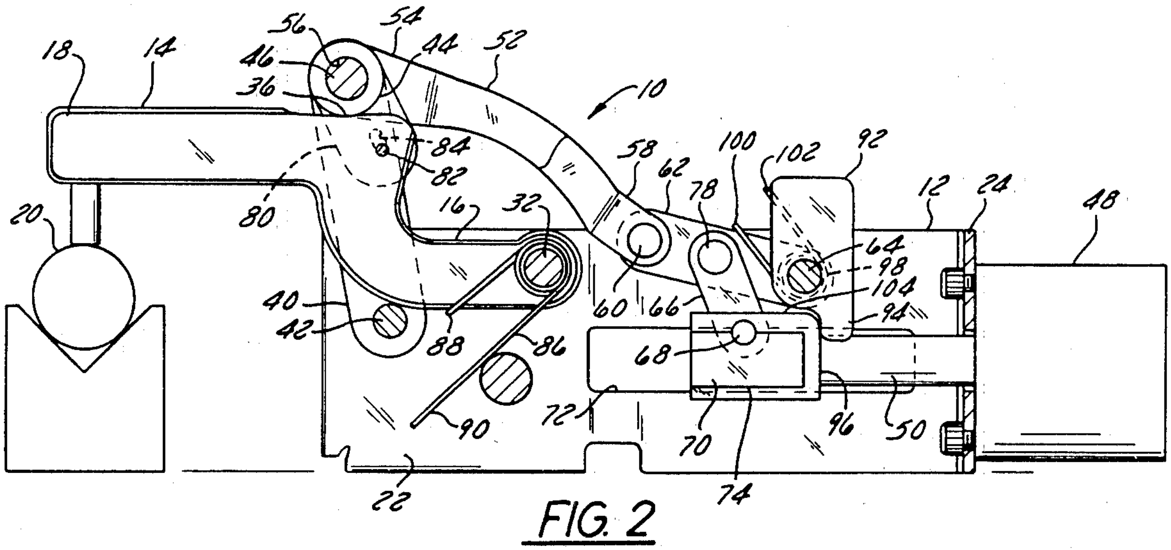
FIG. 2 is a side elevation view of the clamp illustrated in FIG. 1.

While the clamp arm 14 could be supported by the frame 12 in various ways, in the illustrated construction the end 16 of the clamp arm 14 includes a bore housing a pivot pin 32. The opposite ends of the pivot pin 32 are supported by the spaced apart plates 22 and such that the end 18 of the clamp arm 14 is movable between a clamping position as shown in FIG. 2 and a release position shown in FIG. 3.

While the mechanical clamp 10 is shown in the drawings as supported such that the free end or clamping end 18 of the clamp arm 14 is movable vertically, it will be understood by those skilled in the art that the mechanical clamp 10 embodying the invention can be mounted in many different orientations depending on the application of the clamp 10 and on the required position or orientation of the clamping arm 14.

Figure 4:
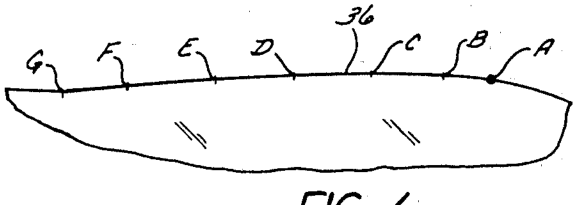
FIG. 4 is a much enlarged side elevation view of a cam surface of the clamp arm embodied in the mechanical clamp illustrated in FIGS. 1–3.

Referring more specifically to the construction of the clamp arm 14, an upper surface of the clamp arm intermediate its opposite ends defines a cam surface 36 shown greatly enlarged in FIG. 4. As will be explained in greater detail hereinbelow, the configuration of the cam surface 36 facilitates the application of a uniform clamping force on a workpiece 20 clamped by the clamp arm 14 regardless of the relative size of the workpiece if the workpiece is within a range of sizes adapted to be clampingly engaged by the clamp mechanism.

Means are also provided for engaging the cam surface 36 or for applying a force on the cam surface 36 to cause pivotal movement of the clamp arm 14 about the pivot pin 32 and consequently clamping movement of the clamp arm 14. This clamping means includes a pair of links or arms 40 positioned on the opposite sides of the clamp arm 14 and including lower ends pivotally joined by pins 42 to the sides 22 of the frame or base 12. The upper ends of the links 40 support a roller 44 therebetween, the roller 44 being adapted to engage the cam surface 36 and to roll along the cam surface 36 in response to pivotal movement of the pair of arms 40 about the pin 42. The roller 44 is supported on a pin 46 having opposite ends fixed to the upper ends of the links 40, and in a preferred form of the invention the roller 44 is freely rotatable on the pin 46.

Means are also provided for causing selective clamping movement of the roller 44 into engagement with the cam surface 36 of the clamping arm 14. This means includes a fluid motor 48 having an extensible piston 20 and a toggle assembly operably connecting the extensible piston 50 to the roller 44 so as to cause clamping movement of the roller 44 in response to movement of the extensible piston 50. While the fluid motor 48 could comprise a hydraulically actuated piston and cylinder, in a preferred form of the invention the fluid motor 48 can comprise a pneumatic cylinder of the type adapted to be connected to a source of compressed air as is commonly available in conventional manufacturing facilities. It will be appreciated by those skilled in the art that in other embodiments the fluid motor 48 could be replaced by mechanical or electrical means for causing linear reciprocating movement.

The toggle assembly operably connecting the extensible piston 50 to the roller 44 is comprised of a first pair of toggle links 52 having opposite ends, the forward ends 54 of these links including bores 56 housing the pin 46 supporting the roller 44. As best shown in FIG. 1, these forward ends 54 of the links 52 are positioned on opposite sides of the clamp arm 14. The rearward ends 58 of the links 52 converge and are pivotally joined by a pin 60 to the forward end of a second toggle link 62. The second toggle link 62 includes a rearward end pivotally connected by a pin 64 to the frame 12 above the linearly extensible piston 50. A third pair of toggle links 66 connect the linearly extensible piston 50 to the second toggle link 62 intermediate its opposite ends. The toggle links 66 are pivotally connected at their lower ends by a pin 68 to a slide member 70, the slide member 70 in turn being supported for linear reciprocal movement along the length of two slots 72 formed in the frame side members 22. The slide member 70 is supported by a pair of tabs 74 which extend outwardly into the slots 72 and are supported therein for linear reciprocal movement. The piston 50 of the pneumatic cylinder is operably connected to the slide 70 to cause linear reciprocal movement of the slide 70 in response to movement of the piston. The third toggle links 66 have upper ends connected by a pin 78 to the second toggle link 62 intermediate its opposite ends.

Figure 3:
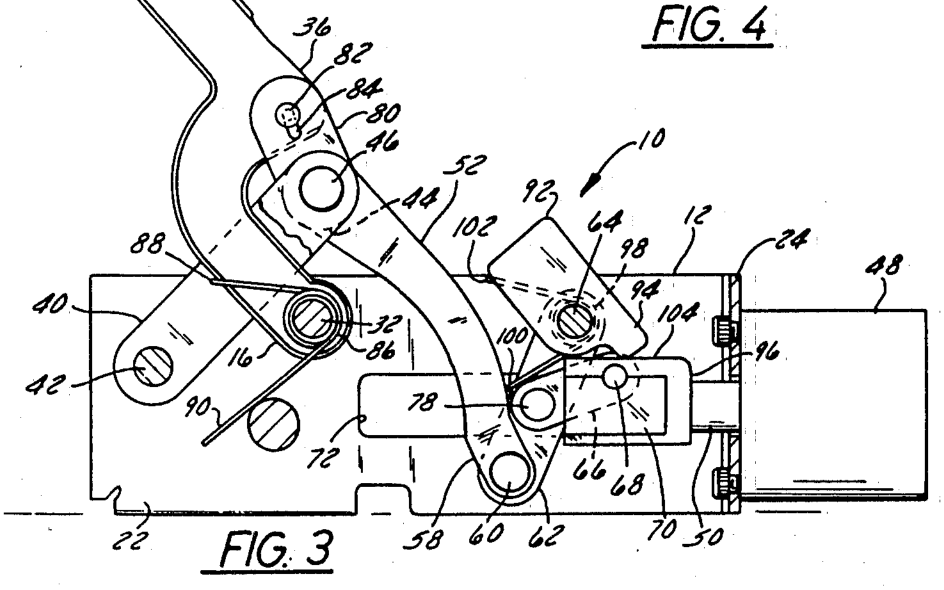
FIG. 3 is a view similar to FIG. 2 and showing the clamping arm of the mechanical clamp in a release position.

In operation of the clamp 10 illustrated in the drawings, when the clamp arm 14 is in the open position shown in FIG. 3, and when compressed air is then supplied to the pneumatic cylinder 48, the slide member 70 is forced forwardly toward the workpiece 20. The third toggle links 66 apply a forward and upward force on the second toggle link 62 and thereby cause the second toggle link 62 to apply a forward and upward force on the ends 58 of the first toggle links 52. The roller 44, supported by the forward ends 54 of the first toggle links 52 and the upper ends of the arm 40, engages the cam surface 36, and as the roller 44 is forced forwardly by the links 52 along the cam surface 36, it causes continued pivotal movement of the clamp arm 14 in a counterclockwise direction as seen in FIGS. 2 and 3. In the event a relatively large workpiece is being clampingly engaged by the clamp arm 14, the roller 44 will be positioned on a first portion of the cam surface 36. If a relatively small workpiece is clampingly engaged, the roller 44 will move farther to the left on the cam surface 36 to the position shown in FIG. 2.

In operation of the clamp, workpieces being clamped in place may vary in thickness. The clamp embodying the present invention includes means for clamping workpieces which may vary in thickness by 1/16 inch or more while also applying approximately the same clamping force on successive workpieces. The cam surface 36 of the clamping arm 14 permits movement of the roller 44 along the cam surface 36 until the clamping end 18 of the clamp arm 14 clampingly engages the workpiece. However, regardless of the relative position of the roller 44 on the cam surface 36, the configuration of the cam surface is such that the force applied by the clamping arm 14 is relatively constant. The force applied by the end 18 of the clamping arm 14 is a product of the downward force applied by the roller 44 against the cam surface 36 and the length of the moment arm, i.e. the distance between the pivot axis of the clamp arm 14 and the point where force is applied by the roller on the cam surface. The length of the moment arm is also dependent on the direction of the force on the cam surface. As the roller 44 moves along the cam surface 36 and away from the pivot axis of the clamping arm 14, the moment arm increases. The cam surface 36 of the clamping arm is particularly shaped such that as the roller moves along the cam surface, the product of the clamping force applied by the roller on the cam surface and the length of the moment arm will be substantially constant regardless of the relative position of the roller 44 on the cam surface 36.

Reference will now be made more specifically to the configuration of the cam surface 36 shown in FIG. 4, and while the clamp 10 embodying the invention may be constructed in various sizes, in the one example of the invention shown there, the cam surface 36 will be constructed such that, when the clamp arm 14 is oriented such that its upper surface is horizontal, Point A on FIG. 4 will be located 1.481 inches above the longitudinal axis of the pivot pin 32 and 1.464 inches to the left of that longitudinal axis as seen in FIG. 2. The cam surface 36 has a configuration such that, in a mechanical clamp 10 wherein the clamp arm 14 is positioned as shown in FIG. 2 and having a Point A located as defined above, Point B will be located 1.487 inches above the longitudinal axis of pivot pin 32 and 1.577 inches to the left of that axis. Point C will be located 1.487 inches above the longitudinal axis and 1.675 inches to the left of that axis. Point D will be located 1.484 inches above that longitudinal axis and 1.747 inches to the left of that axis. Point E will be located 1.480 inches above that longitudinal axis and 1.801 inches to the left of that axis. Point F will be located 1.477 inches above that longitudinal axis and 1.846 inches to the left of that longitudinal axis. Point G will be located 1.476 inches above that longitudinal axis and 1.891 inches to the left of that longitudinal axis. The surface to the left of Point G is planar and comprises the horizontal upper portion of the clamp arm.

With the cam surface having this configuration, the force applied by the clamping end 18 of the clamp arm 14 on the workpiece will be approximately constant regardless of the position of the roller 44 on the cam surface 36 due to variations in size of the workpiece being clamped.

Means are also provided for causing the clamping arm 14 to move to the retracted position as shown in FIG. 3 in response to retraction of the piston 50 of the pneumatic cylinder 48. While the means for causing retraction could have various constructions, in the illustrated arrangement, it includes a pair of relatively short links 80 each having one end pivotally supported by the pins 46 supporting the roller 44 and an opposite end pivotally connected by a pin 82 to the clamp arm 14 intermediate the opposite ends of the clamp arm 14. The short links 80 are positioned on opposite sides of the clamp arm 14 and each include a slot 84 housing the pin 82 connecting the links 80 to the clamp arm 14, and the slots 84 provide limited movement of the roller 44 away from the cam surface 36 of the clamp arm 14. The slots 84 are located such that when the clamp arm 14 is in the clamping position shown in FIG. 2, the roller 44 is movable with respect to the pin 82 such that the roller 44 can move along the cam surface 36. When the piston 50 of the pneumatic cylinder 48 is retracted, and the toggle linkages 52, 62 and 66 are moved to the position shown in FIG. 3, the links 80 pull upwardly and rearwardly on the clamp arm 14 to move the clamp arm from the clamping position of FIG. 2 to the open position of FIG. 3.

Means are also provided for resiliently biasing the clamp arm 14 toward the clamp disengaged position. In the illustrated construction that means includes a torsion spring 86 surrounding the pin 82 supporting the clamp arm 14, one end 88 of the torsion spring engaging the clamp arm and an opposite end 90 engaging to the frame 12.

In the illustrated arrangement means are also provided for selectively locking the clamp arm 14 in the clamping position shown in FIG. 2. This means includes a pivotable locking member 92 supported for relatively free pivotal movement about the pivot pin 64 supporting the rearward end of the toggle link 62. The locking member 92 includes a finger 94 extending downwardly and adapted to engage a rearward surface 96 of the slide 70 to releaseably hold the slide 70 in its forward or extended position when the clamping arm 14 is in its clamping position. A torsion spring 98 is also provided for applying a resilient force on the locking member 92 to cause rotation of the locking member 92 about the pivot pin 64 in a clockwise direction as seen in FIG. 2 and such that the finger 94 engages the rearward surface 96 of the slide 70 and biases it toward the clamping position. In the illustrated arrangement a pair of torsion springs 98 are provided on opposite sides of the locking member 92, one of the ends 100 of each of these springs 98 being supported by the toggle link 62 and the other of the ends 102 of the springs 98 engaging the locking member and applying a torque on the locking member 92 in the clockwise direction as seen in FIGS. 2 and 3.

In operation of the locking member 92, and when the clamping arm 14 is moved from the position shown in FIG. 3 to the position shown in FIG. 2, as the piston 50 of the pneumatic cylinder 48 is extended and the slide 70 moves toward the workpiece 20, the finger 94 of the locking member 92 will slide along the upper surface 104 of the slide 70. As the slide 70 approaches its forward position, the finger 94 will move past the rearward end 96 of the slide 70, and the locking member 92 will pivot from the position shown in FIG. 3 to the position shown in FIG. 2. In this position the torsion springs 98 continues to apply a torque on the locking member 92 such that the finger 94 applies a forward force on the rearward end 96 of the slide 70. This forward force on the slide 70 is in addition to the forward force on the slide applied by the pneumatic cylinder 48. Once the clamp arm 14 is moved to the clamping position, the clamping force on the clamp arm 14 is increased by the force applied by the locking member 92. Additionally, in the event there is an interruption in the clamping force applied by the pneumatic piston 48, caused, for example, by an interruption of the supply of compressed air to the pneumatic cylinder 48, the locking member 92 will maintain a forward force on the slide 70 to restrain the clamping arm 14 from moving to an open position.

When air pressure is supplied to the pneumatic cylinder 48 to cause retraction of the piston 50 and movement of the clamp arm 14 to an open position, the force of the piston 50 is sufficient to overcome the forward force of the finger 94 generated by the torsion springs 98.

While in the illustrated arrangement the mechanical clamp 10 is illustrated as including a single clamping arm 14, and a single toggle arrangement for moving this clamping arm, it will be understood by those skilled in the art that the illustrated apparatus could also be used in back-to-back relation so as to form a gripper with a pair of clamp arms movable toward and away from each other and with a pair of toggle arrangements provided for causing selective clamping movement of the clamp arms.

One of the advantages of the toggle arrangement described above is that it provides high clamping forces on the clamp arm 14 and provides a means for maintaining the clamp arm in clamping engagement with the workpiece 20 without employing an overcenter toggle arrangement. Apparatus using an overcenter toggle construction requires deformation of the toggle links or pivot pins joining the links as the toggle links move overcenter. The high loads placed on the components and their deformation can result in rapid wear of these parts and a short useful life of the mechanical clamp. In mechanical clamps used in manufacturing operations, the clamps may be subjected to very high operating cycles, and a commercially useful clamp must have a long useful life. Applicant's construction provides a clamp capable of a long useful life while also achieving high clamping forces and providing a means for locking the clamp member in the clamping position.

Figure 5:
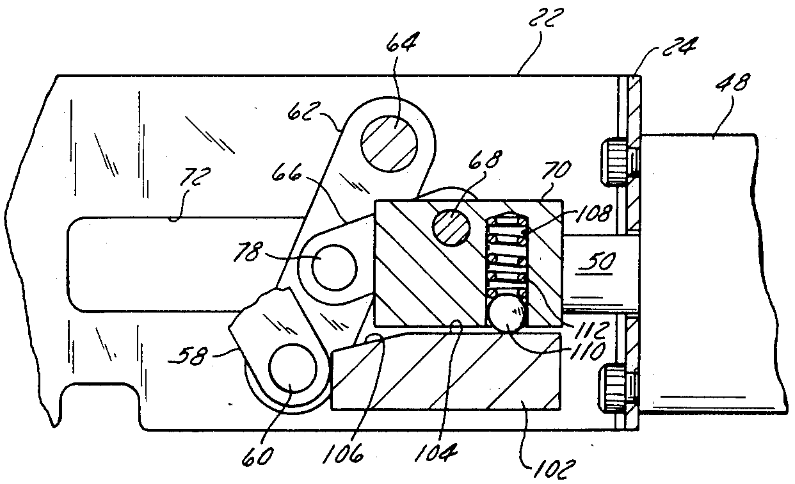
FIG. 5 is an elevation view of an alternative embodiment of a locking means and shown in a retracted position.

FIG. 5 illustrates an alternative embodiment of apparatus for releaseably locking the clamp member 14 in a clamping position. In the embodiment shown in FIG. 5, a slide member 70 is supported by the slot 72 in the side members 12 for linear reciprocal movement. A support block 102 is positioned beneath the slide member 70 and is fixed to the side members 12. The support block 102 includes a planar upper horizontal surface 104 and a ramp surface 106 at one end of the block 102, the ramp surface 106 being at the end of the block 102 opposite the fluid motor 48 and sloping downwardly and forwardly from the upper horizontal surface 104 of the block 102. The slide member 70 includes a pair of bores 108 in its bottom surface. The bores 108 each house a ball 110 and a compression spring 112. The compression spring 112 functions to force the balls 110 downwardly against the upper surface 104 of the support block 102.

Figure 7:
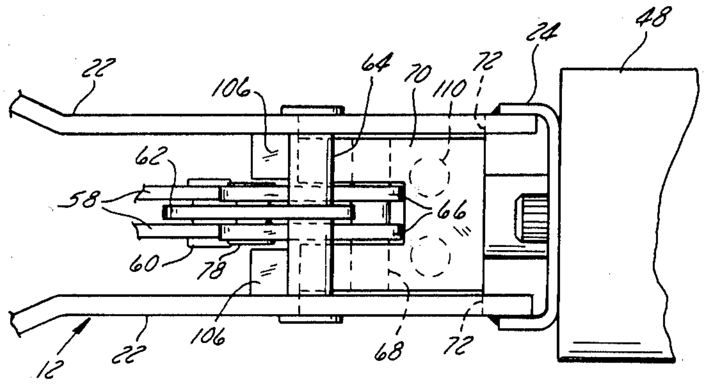
FIG. 7 is a plan view of the apparatus shown in FIG. 5.
Figure 6:
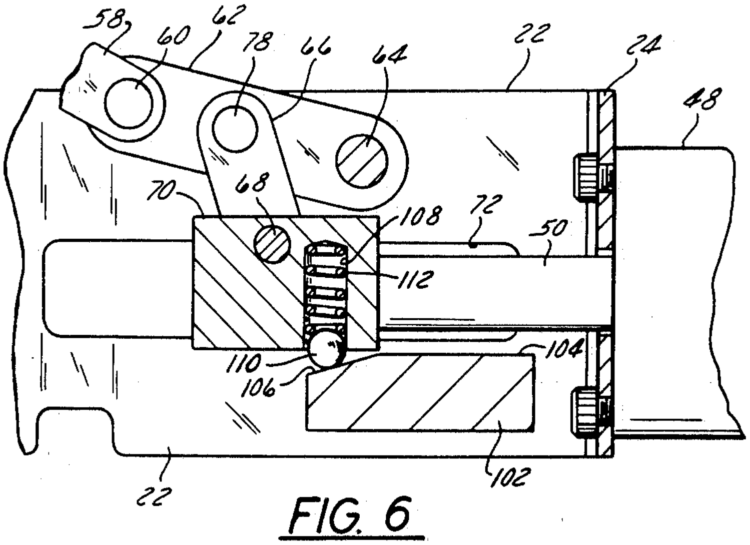
FIG. 6 is a view similar to FIG. 5 and showing the apparatus in a locking position.

In operation of the clamp including the locking means illustrated in FIGS. 5–7, as the slide member 70 moves from the FIG. 5 position, wherein the clamp is opened, to the FIG. 6 position, wherein the clamp clampingly engages a workpiece, the balls 110 housed in the bores 108 will move down the ramp surface 106. The clamp is releasably locked in the FIG. 6 position since the spring force on the balls 110 must be overcome to cause the slide member to return to the FIG. 5 position.

Figure 9:
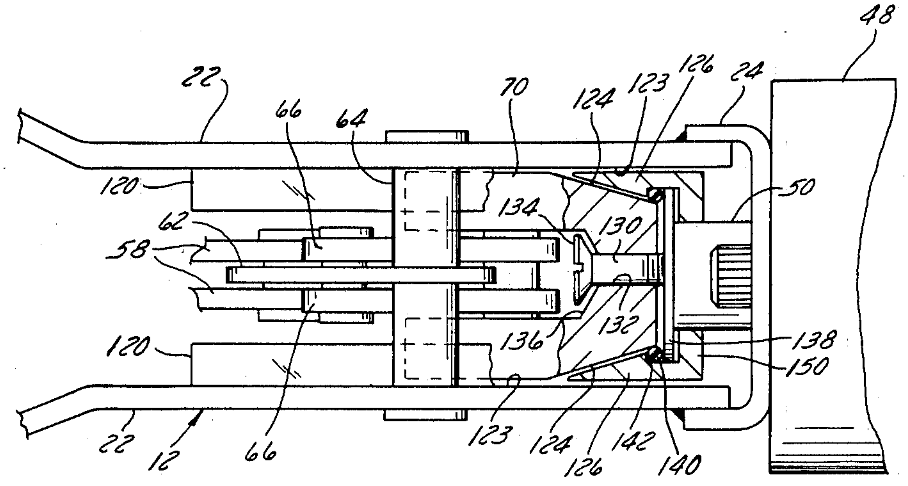
FIG. 9 is a cross section plan view of the locking means shown in FIG. 8.
Figure 8:
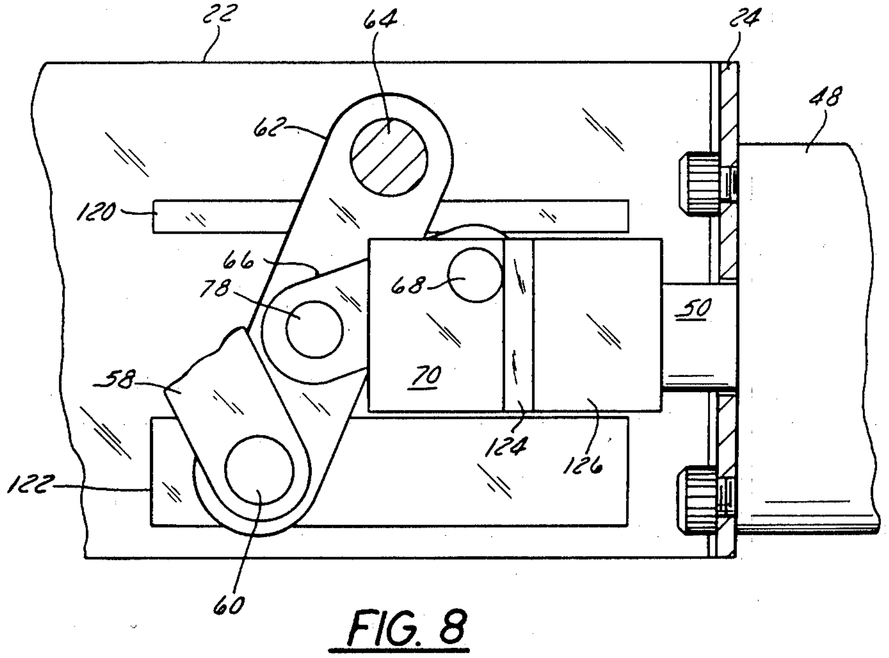
FIG. 8 is a view similar to FIG. 5 and showing another alternative embodiment of the locking means.

FIGS. 8–9 illustrated another alternative embodiment of means for releasably locking the clamp 14 in a clamping position. In that embodiment, the slide member 70 is supported for linear reciprocal movement by guide rails 120 and 122 fixed to the side members 22 and rigidly supported by those side members 22. A wedge assembly is also provided for releasably engaging the inner surfaces 123 of the side members 22 to lock the slide member 70 in position when a rearward force is applied on the slide member 70 by the toggle links 52, 62 and 66 tending to force the slide member to a retracted position. The wedge assembly is comprised of a pair of ramp surfaces 124 defined by a rearward portion of the slide member 70 and a pair of wedges 126 adapted to slideably engage the ramp surfaces 124.

As illustrated in FIG. 9, one end of the slide member 70 is connected to the piston 50 and is adapted to move reciprocably in response to reciprocal movement of the piston 50. Means are also provided for connecting the end of the piston 50 to the slide member 70 such that there can be limited reciprocal movement of the slide member 70 with respect to the end of the piston 50. In the illustrated construction, a screw 130 is housed in a stepped bore 132 in the slide member 70 and the screw 130 includes an end threadably engaging the end of the piston 50. The screw is reciprocably movable in the bore 132 and includes a head 134 adapted to engage a shoulder 136 of the bore 132.

In the construction illustrated in FIGS. 8-9, the ramp surface 124 define planar converging surfaces, these surfaces converging toward the rearward end of the slide member 70. A pair of wedges 126 are supported by the end of the piston 50 and are adapted to slidably engage the converging planar ramp surfaces 124 of the slide member 70. A washer 138 surrounds the screw 130 and is positioned against the end of the piston 50. Resilient members 140 are positioned between the peripheral edge of the washer and opposed shoulders 142 of the wedges 126.

In operation of the locking means illustrated in FIGS. 8-9, if the slide member 70 is forced toward the piston 50, the surfaces 124 of the end of the slide member 70 will move toward the piston thereby causing outward movement of the wedges 126 into frictional engagement with the sidewalls 22 preventing any further movement of the slide member 70.

During the reciprocal operation of the piston 50 and the slide member 70 to cause clamping movement of the clamp member 14, as the piston moves to the left as seen in FIG. 9, the resilient members 140 will be compressed and the piston 50 will force the washer 138 against the rearward end of the slide member 70. The force applied by the compressed resilient members 140 against the shoulders 142 of the wedges 126 is not sufficient to cause the wedges 126 to frictionally engage the sidewalls 22 with sufficient force to prevent reciprocal movement of the slide member 70. When the piston 50 moves to the right as shown in FIG. 10, to the retracted position, the washer 138, which is secured to the piston 50 will engage the shoulders 150 of the wedge members 126 before the head 134 of the screw engages the shoulder 136. The washer 138 will move the wedge members 126 toward the retracted position and the screw head 134 will engage shoulder 136 to move the slide member 70 to the retracted position.

Various features of the invention are set forth in the following claims:

We claim:

1. A mechanical clamp for use in clampingly engaging a workpiece, the mechanical clamp comprising:
 a frame,
 a clamp member having an end portion supported for movement toward and away from a supporting surface and adapted to clampingly engage a workpiece against the supporting surface, said clamp member including a cam surface,
 means for pivotally connecting said clamp member to the frame such that the clamp member is pivotally movable between a clamping position wherein the end portion of the clamp member clampingly engages the workpiece against the supporting surface and a release position wherein the end portion releases the workpiece,
 means for selectively forcing said end portion of said clamp member into clamping engagement with the workpiece, said means for selectively forcing including a force applying member engageable with said cam surface,
 a first toggle lever having opposite ends, one of said opposite ends being pivotally connected to said force applying member, a second toggle lever having opposite ends, one of said second toggle lever opposite ends being pivotally connected to said frame and the other of said second toggle member opposite ends being pivotally connected to the other of said opposite ends of said first toggle lever, and a third toggle lever having opposite ends, one of said third toggle lever opposite ends being pivotally connected to said second toggle lever intermediate its opposite ends, and the other of said third toggle lever opposite ends being pivotally connected to a piston for reciprocal movement with said piston between an extended position wherein said clamp member is in said clamping position and a retracted position wherein said clamp member is in said release position, and
 means for releaseably locking said third toggle lever in said extended position.

2. A mechanical clamp as set forth in claim 1 wherein said means for releaseably locking includes a locking member supported for pivotal movement between a release position and a locking position wherein said third toggle lever is held in said extended position.

3. A mechanical clamp as set forth in claim 2 and further including a slide member supported for reciprocal linear movement between an extended position and a retracted position, said slide member connects said third toggle lever to said piston, and said slide member having a rearward surface portion, and wherein said locking member includes an engaging portion adapted to slideably engage an upper portion of the slide as the slide moves from said retracted position to said extended position and said engaging portion being adapted to engage said rearward surface portion of said slide when the slide is in the extended position.

4. A mechanical clamp as set forth in claim 3 wherein said means for releaseably locking further includes spring means for resiliently biasing said locking member for pivotal movement to a position wherein said locking member engaging portion engages said rearward surface portion of said slide.

5. A mechanical clamp as set forth in claim 2 and further including a pin pivotally connecting said one of said second toggle lever opposite ends to said frame, said pin having a longitudinal axis, and said locking member being supported by said pin for pivotal movement around said longitudinal axis.

6. A mechanical clamp as set forth in claim 2 and wherein said cam surface has opposite ends and a configuration such that the force applied by said end portion on said workpiece when said force applying member engages one of said opposite ends of said cam surface is approximately equal to the force applied by said end portion when said force applying member engages the other of said opposite ends of said cam surface.

7. A mechanical clamp as set forth in claim 6 wherein said force applying member includes a roller adapted to engage said cam surface.

8. A mechanical clamp as set forth in claim 7 wherein said end portion is spaced from the supporting surface by a first dimension when the force applying member engages one of said opposite ends of said cam surface and wherein said end portion is spaced from the supporting surface by a second dimension when the force applying member engages the other of the opposite ends of said cam surface.

9. A mechanical clamp as set forth in claim 7 and further including a pivot arm having opposite ends, one end pivotally connected to said frame and an opposite end supporting said roller, and means for selectively forcing said roller into engagement with said cam surface.

10. A mechanical clamp as set forth in claim 1 and further including a slide member supported by said frame for reciprocal linear movement with said piston between an extended position and a retracted position, said slide member supporting said other of said opposite ends of said third toggle lever, and wherein said means for releaseably locking includes means for releaseably securing said slide member in said extended position.

11. A mechanical clamp as set forth in claim 10 wherein said means for releaseably securing includes a support member fixed to said frame and including a support surface adjacent said slide member said support surface including a portion inclined away from said slide and in the direction from said retracted position toward said extended position, and means supported by said slide for resiliently engaging said support surface.

12. A mechanical clamp as set forth in claim 11 wherein said slide member includes a bore having an opening adjacent said support surface, and said means for resiliently engaging includes a ball housed in said bore and spring means housed in said bore and biasing said ball toward said support surface.

13. A mechanical clamp as set forth in claim 10 wherein said slide member includes at least one ramp surface and wherein said means for releaseably securing said slide member in said extended position includes a wedge member supported by said piston and positioned between said ramp surface and said frame such that said wedge member is wedged between said frame and said slide member is said slide member is forced toward said retracted position by said third toggle lever.

* * * * *